S. J. BAILEY.
AUTOMATIC VEHICLE BRAKE.
APPLICATION FILED MAY 18, 1916.
1,209,538.
Patented Dec. 19, 1916.
2 SHEETS—SHEET 1.
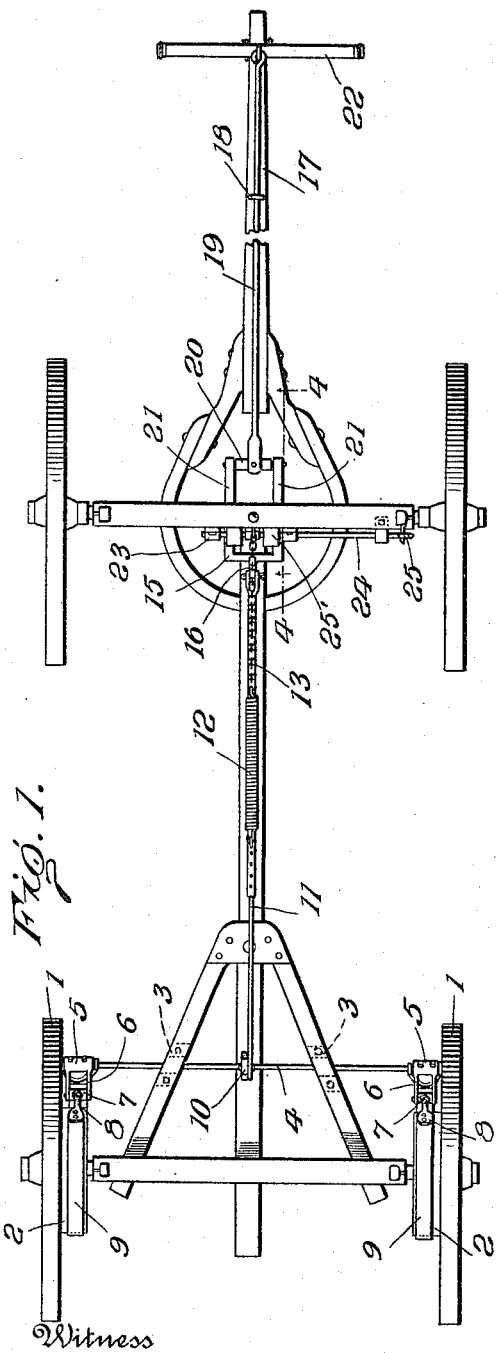
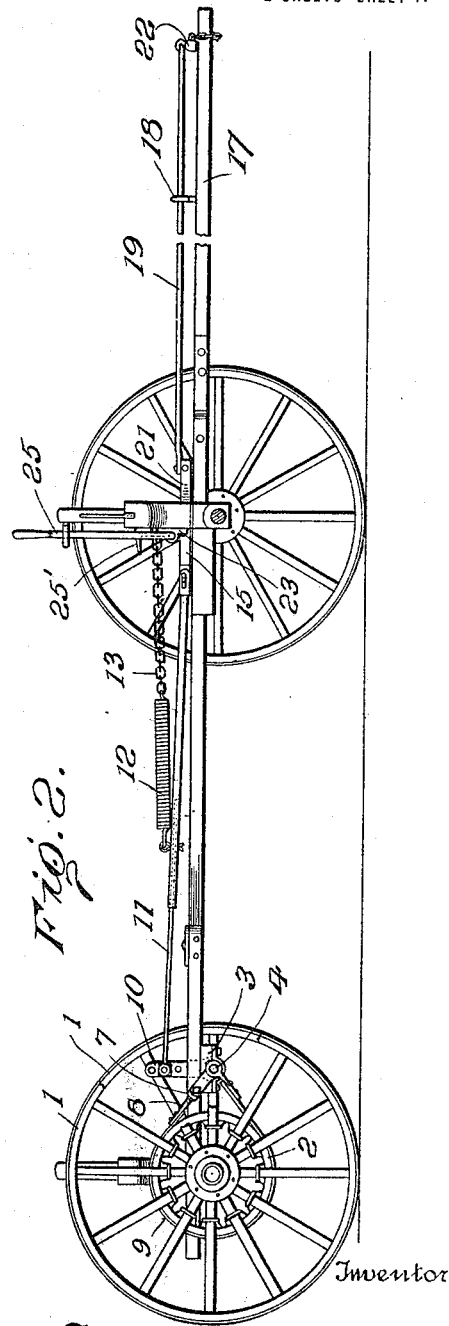
Inventor
Sylvester J. Bailey S. J. BAILEY.
AUTOMATIC VEHICLE BRAKE.
APPLICATION FILED MAY 18, 1916.
1,209,538.
Patented Dec. 19, 1916.
2 SHEETS—SHEET 2.
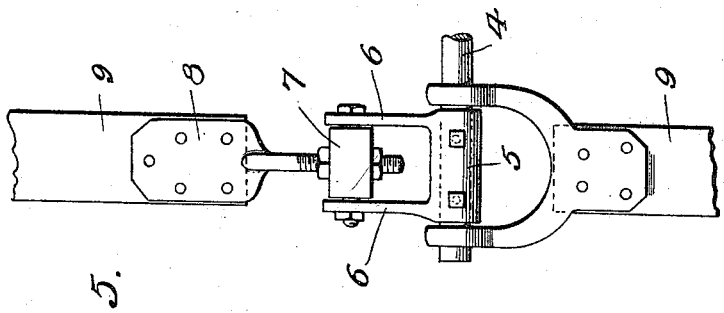
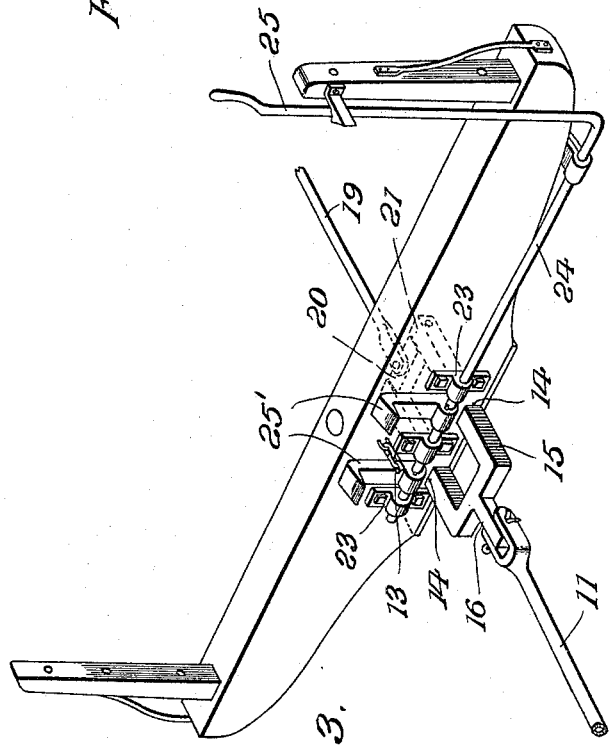
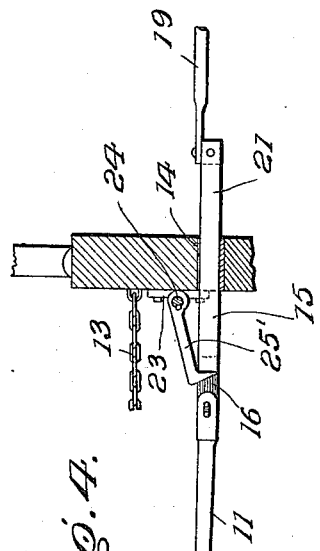
Inventor
Sylvester J. Bailey
Witness
N. Abramson
by H. B. Willson &Co.
Attorneys

UNITED STATES PATENT OFFICE.

SYLVESTER J. BAILEY, OF CLARK, SOUTH DAKOTA.

AUTOMATIC VEHICLE-BRAKE.

1,209,538.

Specification of Letters Patent. Patented Dec. 19, 1916.

Application filed May 18, 1916. Serial No. 98,404.

*To all whom it may concern:*

Be it known that I, SYLVESTER J. BAILEY, a citizen of the United States, residing at Clark, in the county of Clark and State of South Dakota, have invented certain new and useful Improvements in Automatic Vehicle-Brakes; and I do declare the following to be a full, clear, and exact description of the invention, such as will enable others skilled in the art to which it appertains to make and use the same.

This invention relates to vehicle brakes for use especially on farm wagons, but is equally applicable on other forms of horse drawn vehicles.

One object of the invention is to provide a simple and efficient brake which is automatically drawn into operation by the holding back action of the draft animals when proceeding down a hill or incline, said holding back of the animals serving to automatically apply the brake means to the vehicle wheels and check the movement of the vehicle without any attention whatever on the part of the driver.

Another object of the invention is to provide a device of this character which will be simple, strong, durable and inexpensive in construction, efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings in which similar reference characters designate like parts throughout the several views: Figure 1 is a top plan view of a farm wagon having a brake constructed in accordance with this invention applied thereto; Fig. 2 is a side elevation of the same, partially in section; Fig. 3 is a perspective view of the front bolster of the same; Fig. 4 is a vertical sectional view through the front bolster taken on the plane of the line 4—4 of Fig. 1; and Fig. 5 is a detail view showing the manner in which the brake bands are connected to the rock shaft.

In the embodiment illustrated, an ordinary farm wagon is shown, the rear wheels 1 of which are provided with brake drums 2, the latter being fixed to the inner sides thereof by suitable elements which pass around the spokes of the wheels. The rear hounds of the wagon are provided on their lower sides with bearings 3, in which is mounted a rock shaft 4. This rock shaft 4 extends transversely across the running gear of the wagon and is provided at its ends with sleeves 5, the latter being fixed to said ends in any suitable manner and having spaced lugs 6 extending laterally therefrom. Pivotally mounted between the free ends of the lugs 6 are blocks 7 having apertures therein, through which extend the threaded shank portions of members 8 which are firmly secured to one of the ends of brake bands 9. These brake bands 9 extend around the brake drums 2 and have their other ends connected to the ends of the rock shaft 4 in any suitable manner, but here shown as being provided with U-shaped members having eyes on the free ends of the arms thereof, said eyes being adapted to receive the ends of said rock shaft. By this construction it may be readily seen that when the rock shaft 4 is rocked, the bands 9 will be tightened around the brake drums 2 to effect a braking action upon the wheels of the wagon.

To operate the above braking means, the rock shaft 4 is provided with an arm 10 which extends substantially upwardly from the intermediate portion thereof, this arm 10 being pivotally connected near its free end to a push rod 11, the latter being preferably composed of two parts locked together at their adjacent ends in any suitable manner in order to provide a longitudinal adjustment of the same. This push rod is retained in its forwardmost position by a coiled spring 12, one end of which is connected to said rod, while its other end is connected to a flexible element 13, the latter being in turn anchored in any suitable manner to a stationary part of the wagon.

The front bolster of the wagon is provided on its under side substantially midway the length thereof with a pair of notches 14. Slidable through the notches 14 is a U-shaped member 15, the rear end of which is provided with a lug 16 to which the forward end of the push rod 11 is connected.

Arranged alongside the tongue 17 of the wagon and slidable in a suitable guide 18 fixed to said tongue, is a rod 19. The rear end of this rod 19 is connected to a block 20 which is pivotally mounted between the free ends of the arms 21 of the U-shaped member 15. The forward end of the rod 19 is connected in any suitable manner to the neck yoke 22 of the wagon tongue, it being understood that this neck yoke 22 is in turn connected in the usual manner to the harness on the draft animals when the same are hitched up.

Mounted in suitable guides 23 arranged on the rear side of the front bolster of the wagon is a short rock shaft 24, the outer end of which is turned laterally at right angles to provide a handle 25 for operating the same, said handle being disposed within the reach of the driver of the wagon. Fixed to the inner end of the rock shaft 24 is a pair of members or lugs 25' which extend laterally therefrom, the free ends of said members 25' being bent at right angles to form in effect hooks which are adapted to engage the rear end of the aforesaid U-shaped member 15 on each side of the lug 16 and lock said member against movement. By this arrangement of parts it will be seen that when the locking means just described is thrown out of operation and the draft animals are hitched to the wagon, and the wagon is proceeding down a hill or incline, the speed of the same will be checked, due to the pulling back of the horses. When, however, the wagon is not going down a hill and the neck yoke is not pulled backwardly upon by the horses in holding back, the braking means will not be thrown into operation. Thus it may be seen that a vehicle brake is provided which is automatic in operation, thereby not requiring constant watching on the part of the drive of the wagon.

From the above description, taken in connection with the accompanying drawings, the construction and operation of the device will be readily understood without a more extended explanation.

As numerous changes in form, proportion, and in the minor details of construction may be resorted to without departing from the spirit of this invention, I do not wish to be limited to the construction herein shown and described, other than to that set forth in the appended claims.

I claim:

1. In a device of the class described, the combination of a member mounted on the front bolster of a wagon and slidable longitudinally of the latter, a rod arranged alongside the tongue of the wagon and connected to said member, said rod being also connected to the harness of the draft animals, brake means connected with said member, a rock shaft mounted on said bolster and having an operating handle extending therefrom within reach of the driver of the wagon, and a member carried by said shaft and positioned for hooking over the edge of the aforesaid slidable member for locking the same against movement.

2. In a device of the class described the combination of a substantially U-shaped member mounted in notches in the front bolster of a wagon and slidable longitudinally of the latter, the free ends of the parallel arms of said U-shaped member extending forwardly through said notches, a cross bar rotatably mounted between the free ends of said arms, a rod arranged alongside of the tongue of the wagon and having one end secured to said cross bar and the other end thereof secured to the harness of the animals, a rearwardly extending lug on the rear transverse bar of the U-shaped member, a brake operating rod secured to said lug and extending rearwardly therefrom, a rock shaft mounted on said bolster and having a handle extending therefrom within reach of the driver of the wagon, a pair of lugs mounted on said rock shaft, said lugs having their free ends bent downwardly to form hooks adapted for engagement with the outer faces of the aforesaid rear transverse bar, and a coiled spring connecting the brake operating rod with the front bolster of a wagon whereby the brake is normally held in inoperative position.

In testimony whereof I have hereunto set my hand in presence of two subscribing witnesses.

SYLVESTER J. BAILEY.

Witnesses:
WILLIAM MODEST AYSIN,
GEORGE CAMERON GRIFFIN.

Copies of this patent may be obtained for five cents each, by addressing the "Commissioner of Patents, Washington, D. C."